(12) United States Patent
Li et al.

(10) Patent No.: US 11,792,404 B2
(45) Date of Patent: *Oct. 17, 2023

(54) METHOD AND DEVICE FOR SIGNALING INFORMATION ON CHROMA FORMAT

(71) Applicant: LG ELECTRONICS INC., Seoul (KR)

(72) Inventors: Ling Li, Seoul (KR); Jaehyun Lim, Seoul (KR); Jin Heo, Seoul (KR); Junghak Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,562

(22) Filed: Jul. 22, 2022

(65) Prior Publication Data

US 2022/0368919 A1 Nov. 17, 2022

Related U.S. Application Data

(63) Continuation of application No. 17/475,104, filed on Sep. 14, 2021, now Pat. No. 11,431,985, which is a
(Continued)

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/159* (2014.11);
(Continued)

(58) Field of Classification Search
CPC .. H04N 19/132; H04N 19/117; H04N 19/159; H04N 19/176; H04N 19/186;
(Continued)

(56) References Cited

U.S. PATENT DOCUMENTS

2014/0105276 A1  4/2014 Nakamura et al.
2015/0358631 A1  12/2015 Zhang et al.
(Continued)

FOREIGN PATENT DOCUMENTS

KR  10-2014-0120336 A  10/2014
KR  10-2015-0139884 A  12/2015
(Continued)

OTHER PUBLICATIONS

L. Li et al., "CE3-related: ISP support for 4:2:2 and 4:4:4", Joint Video Experts Team (JVET) of ITU-T SG 16 WP 3 and ISO/IEC JTC 1/SC 29/WG 11, Mar. 19-27, 2019, JVET-N0224-v1, XP030209785.

(Continued)

*Primary Examiner* — Matthew K Kwan
(74) *Attorney, Agent, or Firm* — Bryan Cave Leighton Paisner LLP

(57) ABSTRACT

An image decoding method performed by a decoding device according to the present disclosure comprises the steps of: receiving a bitstream including prediction information for a current block; deriving a chroma array type for the current block on the basis of a separate color plane flag indicating whether three color components are separately coded and a chroma format index indicating a chroma format sampling structure for the current block, which are included in the prediction information for the current block; deriving prediction samples for the current block on the basis of the derived chroma array type; and deriving reconstructed samples for the current block on the basis of the prediction samples.

5 Claims, 13 Drawing Sheets

Related U.S. Application Data continuation of application No. PCT/KR2020/003463, filed on Mar. 12, 2020.

(60) Provisional application No. 62/819,489, filed on Mar. 15, 2019.

(51) Int. Cl.
  *H04N 19/159* (2014.01)
  *H04N 19/176* (2014.01)
  *H04N 19/186* (2014.01)
  *H04N 19/46* (2014.01)
  *H04N 19/82* (2014.01)
  *H04N 19/96* (2014.01)

(52) U.S. Cl.
  CPC ......... *H04N 19/176* (2014.11); *H04N 19/186* (2014.11); *H04N 19/46* (2014.11); *H04N 19/82* (2014.11); *H04N 19/96* (2014.11)

(58) Field of Classification Search
  CPC ........ H04N 19/46; H04N 19/82; H04N 19/96; H04N 19/11; H04N 19/119; H04N 19/136; H04N 19/593; H04N 19/70; H04N 19/157; H04N 19/42
  USPC .................................................... 375/240.02
  See application file for complete search history.

(56) References Cited

U.S. PATENT DOCUMENTS

| | | |
|---|---|---|
| 2015/0373332 A1 | 12/2015 | Kim et al. |
| 2021/0029352 A1 | 1/2021 | Zhang |

FOREIGN PATENT DOCUMENTS

| | | |
|---|---|---|
| KR | 10-2017-0010903 A | 2/2017 |
| WO | 2018/045207 A1 | 3/2018 |

OTHER PUBLICATIONS

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v1.

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v2.

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v3.

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v4.

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v5.

B. Bross et al., "Versatile Video Coding (Draft 2)", Joint Video Experts Team (JVET) of ITU-T SG 16 WP 3 and ISO/IEC JTC 1/SC 29/WG 11, Jul. 10-18, 2018, JVET-K1001-v6.

B. Bross et al., "Versatile Video Coding (Draft 4)", Joint Video Experts Team (JVET) of ITU-T SG 16 WP 3 and ISO/IEC JTC 1/SC 29/WG 11, Jan. 9-18, 2019, JVET-M1001-v6.

Bross et al. ("Versatile Video Coding (Draft 2)"), Jul. 2018, JVET-K1001, see office actions for citations. (Year: 2018).

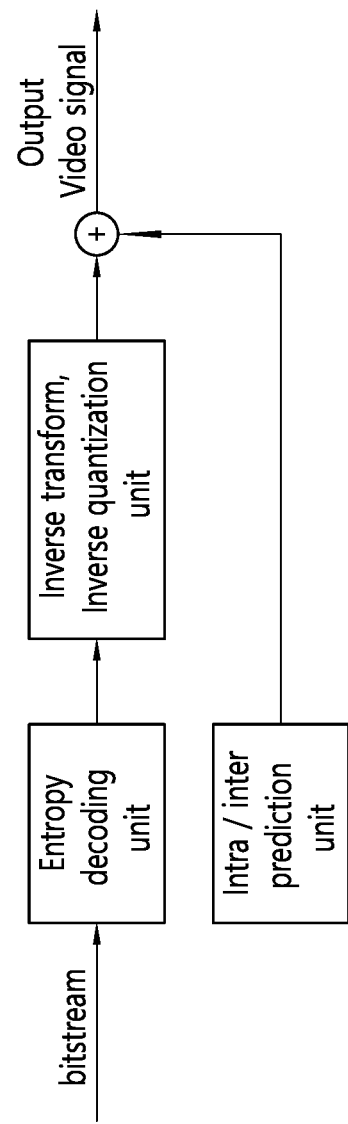

ENCODING APPARATUS

DECODING APPARATUS

METHOD AND DEVICE FOR SIGNALING INFORMATION ON CHROMA FORMAT

CROSS-REFERENCE TO RELATED APPLICATIONS

This application is a Continuation of Application No. 17/475,104, filed on Sep. 14, 2021, which is a Continuation of International Application No. PCT/KR2020/003463, filed on Mar. 12, 2020, which claims the benefit of U.S. Provisional Application No. 62/819,489, filed on Mar. 15, 2019, the contents of which are all hereby incorporated by reference herein in their entirety.

BACKGROUND OF DISCLOSURE

Field of the Disclosure

This disclosure relates to image coding technology and, more particularly, to a method and apparatus for signaling information on a chroma format in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

This disclosure is to provide a method and apparatus for improving image coding efficiency.

This disclosure is also to provide a method and apparatus for improving efficiency of intra prediction.

This disclosure is still also to provide a method and an apparatus for signaling information on a chroma format.

This disclosure is still also to provide a method and apparatus for predicting a current block based on a chroma array type for the current block.

This disclosure is still also to provide a method and apparatus which determine whether or not the tree type for deriving the current block is a chroma tree within a single tree or a dual tree, based on determination that the value of the chroma array type for the current block is not 0, and predict the current block based on the determination that it is a chroma tree within the single tree or dual tree.

According to an embodiment of this disclosure, an image decoding method performed by a decoding apparatus is provided. The method includes receiving a bitstream including prediction information for a current block, deriving a chroma array type for the current block based on a chroma format index related to a chroma format sampling structure for the current block, and on a separate color plane flag related to whether or not three color components are coded separately, wherein the chroma format index and the separate color plane flag are included in the prediction information for the current block, deriving prediction samples for the current block based on the derived chroma array type, and deriving reconstructed samples for the current block based on the prediction samples, wherein the three color components include a luma component and chroma components, and the chroma components include a Cb component and a Cr component.

According to another embodiment of this disclosure, a decoding apparatus for performing image decoding is provided. The decoding apparatus includes an entropy decoder which receives a bitstream including prediction information for a current block, and derives a chroma array type for the current block based on a chroma format index related to a chroma format sampling structure for the current block, and on a separate color plane flag related to whether or not three color components are coded separately, wherein the chroma format index and the separate color plane flag are included in the prediction information for the current block, a predictor which derives prediction samples for the current block based on the derived chroma array type, and an adder which derives reconstructed samples for the current block based on the prediction samples, wherein the three color components include a luma component and chroma components, and the chroma components include a Cb component and a Cr component.

According to still another embodiment of this disclosure, an image encoding method performed by an encoding apparatus is provided. The method includes generating a chroma format index related to a chroma format sampling structure for a current block, generating a separate color plane flag related to whether or not three color components are coded separately, deriving a chroma array type for the current block based on the chroma format index and the separate color plane flag, deriving prediction samples for the current block based on the derived chroma array type, deriving residual samples for the current block based on the prediction samples, and encoding residual information including information on the residual samples, wherein the three color components include a luma component and chroma components, and the chroma components include a Cb component and a Cr component.

According to still another embodiment of this disclosure, an encoding apparatus for performing image encoding is provided. The encoding apparatus includes a predictor which generates a chroma format index related to a chroma format sampling structure for a current block, generates a separate color plane flag related to whether or not three color components are coded separately, derives a chroma array type for the current block based on the chroma format index and the separate color plane flag, and derives prediction samples for the current block based on the derived chroma array type, a residual processor which derives residual samples for the current block based on the prediction samples, and an entropy encoder which encodes residual information including information on the residual samples, wherein the three color components include a luma component and chroma components, and the chroma components include a Cb component and a Cr component.

According to still another embodiment of this disclosure, there is provided a decoder-readable storage medium which stores information on instructions that cause a video decoding apparatus to perform decoding methods according to some embodiments.

According to still another embodiment of this disclosure, there is provided a decoder-readable storage medium which stores information on instructions that cause a video decoding apparatus to perform decoding method according to an embodiment. The decoding method according to the embodiment includes receiving a bitstream including prediction information for a current block, deriving a chroma array type for the current block based on a chroma format index related to a chroma format sampling structure for the current block, and on a separate color plane flag related to whether or not three color components are coded separately, wherein the chroma format index and the separate color plane flag are included in the prediction information for the current block, deriving prediction samples for the current block based on the derived chroma array type, and deriving reconstructed samples for the current block based on the prediction samples, wherein the three color components include a luma component and chroma components, and the chroma components include a Cb component and a Cr component.

According to this disclosure, it is possible to improve overall image/video compression efficiency.

According to this disclosure, it is possible to improve the intra prediction efficiency.

According to this disclosure, it is possible to perform intra prediction efficiently based on an MPM list.

According to this disclosure, the efficiency of intra prediction can be increased by efficiently signaling information on the chroma format.

According to this disclosure, the current block may be efficiently predicted based on the chroma array type for the current block.

According to the this disclosure, by determining whether or not the tree type for deriving the current block is a chroma tree within a single tree or a dual tree, based on determination that the value of the chroma array type for the current block is not 0, the current block can be efficiently predicted.

BRIEF DESCRIPTION OF THE DRAWINGS

FIGS. 4A and 4B are diagrams illustrating an example of an image encoding method performed by an encoding apparatus according to an embodiment, and an example of an image decoding method performed by a decoding apparatus according to an embodiment.

DESCRIPTION OF EMBODIMENTS

Figure 1:
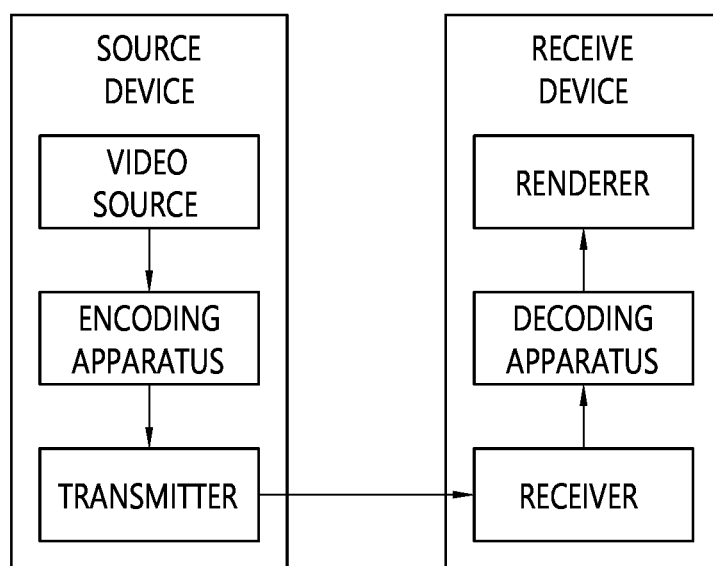
FIG. 1 schematically illustrates an example of a video/image coding system to which this disclosure may be applied.

The present disclosure may be modified in various forms, and specific embodiments thereof will be described and illustrated in the drawings. However, the embodiments are not intended for limiting the present disclosure. The terms used in the following description are used to merely describe specific embodiments, but are not intended to limit the present disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in the present disclosure is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of the present disclosure, embodiments in which configurations are combined and/or separated are included in the scope of the present disclosure.

Hereinafter, embodiments of the present disclosure will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

The present disclosure relates to video/image coding. For example, a method/embodiment disclosed in the present disclosure may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In the present disclosure, a tile group and a slice may be used in place of each other. For example, in the present disclosure, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In the present disclosure, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in the present disclosure should be interpreted to indicate "additionally or alternatively."

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Figure 2:
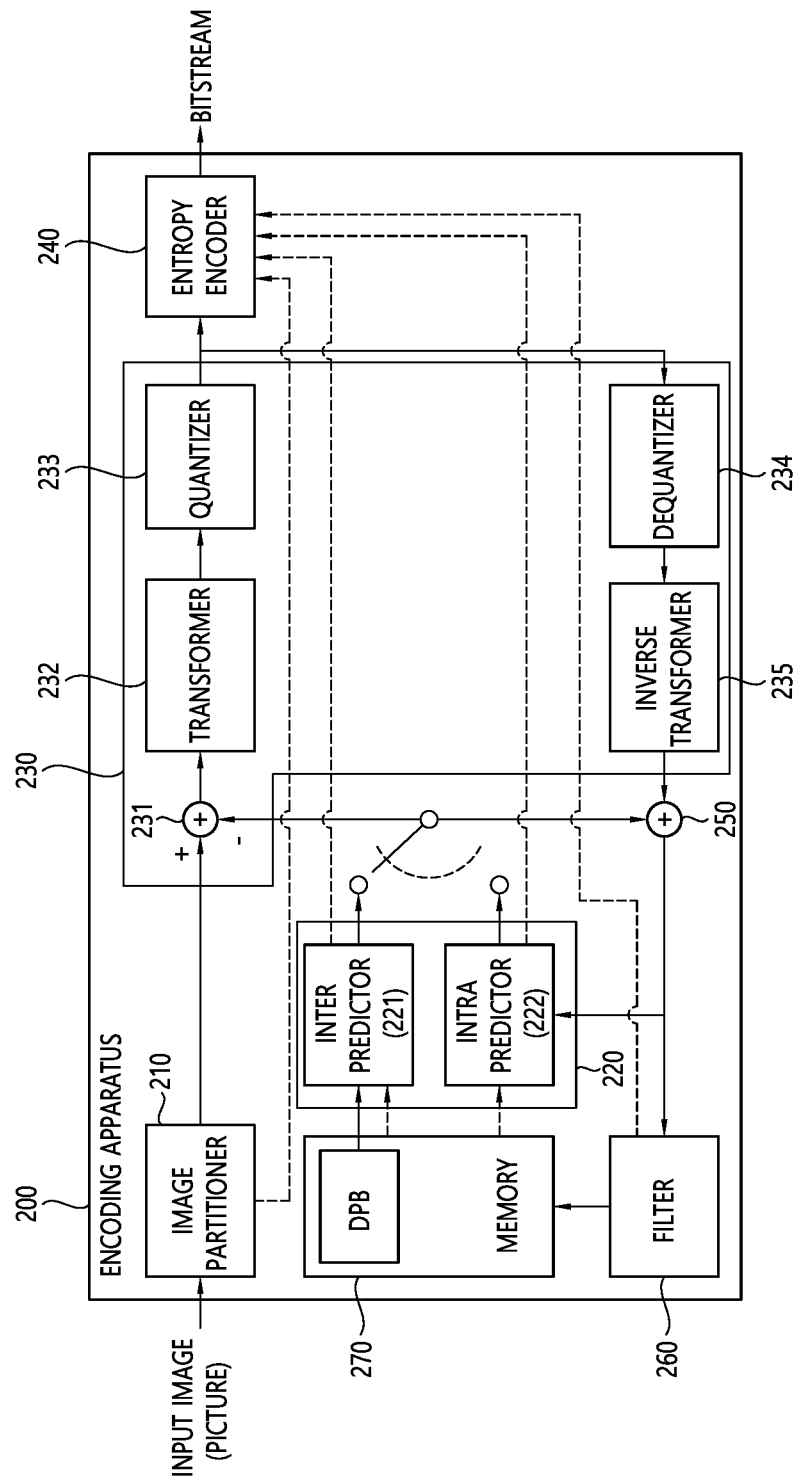
FIG. 2 is a diagram schematically illustrating a configuration of a video/image encoding apparatus to which this disclosure may be applied.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loève transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
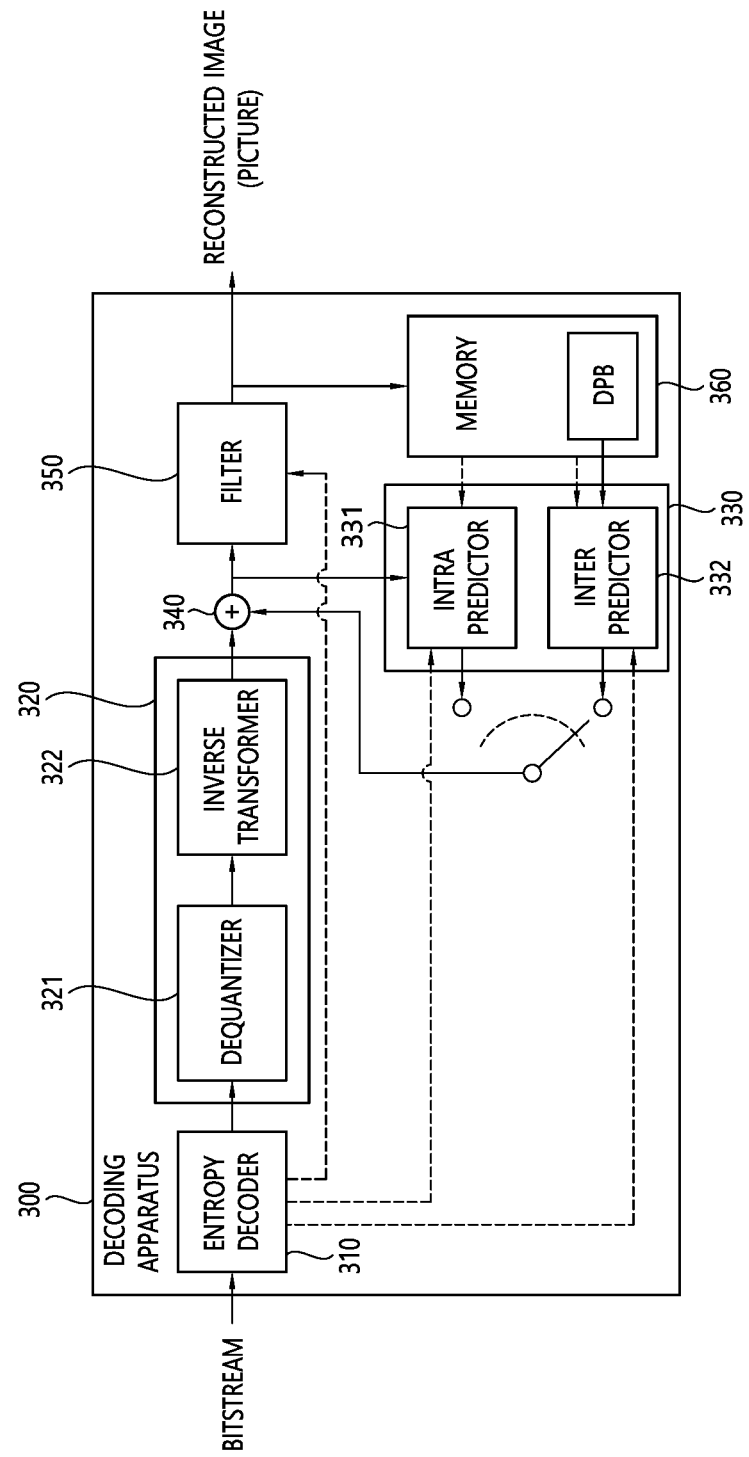
FIG. 3 is a diagram for schematically explaining a configuration of a video/image decoding apparatus to which this disclosure may be applied.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

Figure 4A:
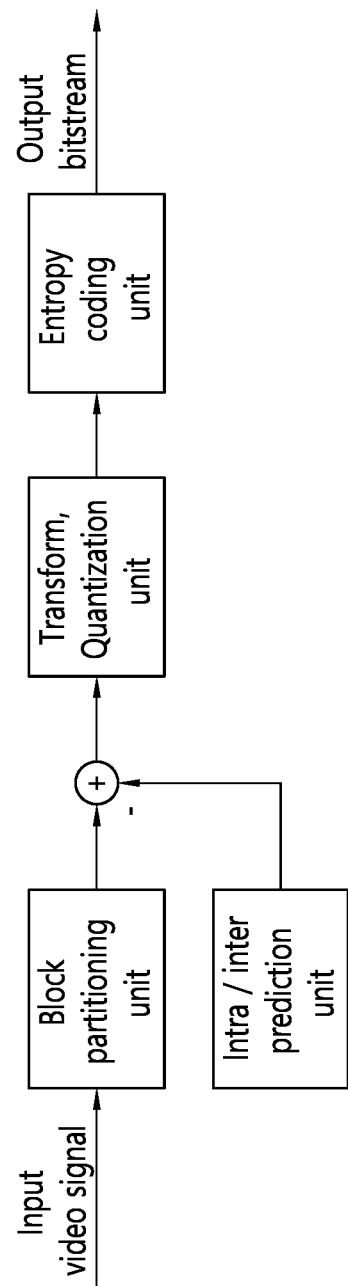

FIGS. 4A and 4B are diagrams illustrating an example of an image encoding method performed by an encoding apparatus according to an embodiment, and an example of an image decoding method performed by a decoding apparatus according to an embodiment.

FIG. 4A illustrates an example of an image encoding method performed by a video encoding apparatus. Referring to FIG. 4A, the image encoding method may include block partitioning, intra/inter prediction, transform, quantization, and entropy encoding processes. For example, the current picture may be partitioned into a plurality of blocks, a prediction block of the current block may be generated through intra/inter prediction, and a residual block of the current block may be generated by subtracting the input block of the current block and the prediction block. Thereafter, a coefficient block, i.e., transform coefficients of the current block, may be generated by transforming the residual block. The transform coefficients may be quantized and entropy encoded and stored in a bitstream.

FIG. 4B illustrates an example of an image decoding method performed by a decoding apparatus. Referring to FIG. 4B, the image decoding method may include entropy decoding, inverse quantization, inverse transform, and intra/inter prediction processes. For example, the decoding apparatus may perform the reverse process of the encoding method. Specifically, quantized transform coefficients may be obtained through the entropy decoding of the bitstream, and a coefficient block of the current block, i.e., transform coefficients, may be obtained through the inverse quantization process of the quantized transform coefficients. A residual block of the current block may be derived through the inverse transform of the transform coefficients, and a reconstructed block of the current block may be derived through addition of the prediction block of the current block derived through intra/inter prediction and the residual block.

Figure 5:
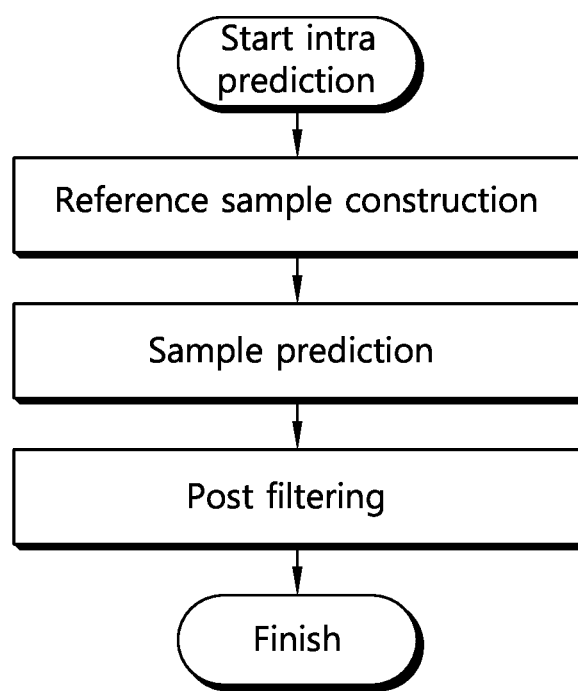
FIG. 5 is a flowchart illustrating an intra prediction method according to an embodiment.

FIG. 5 is a flowchart illustrating an intra prediction method according to an embodiment.

As shown in FIG. 5, the intra prediction method according to an embodiment may include the following three steps. That is, the intra prediction method according to an embodiment may include a reference sample construction step, a sample prediction step, and a post-filtering step. In the sample prediction step, the intra prediction method according to the embodiment may use known neighboring reference samples and an intra prediction mode to perform prediction on unknown samples.

Figure 6:
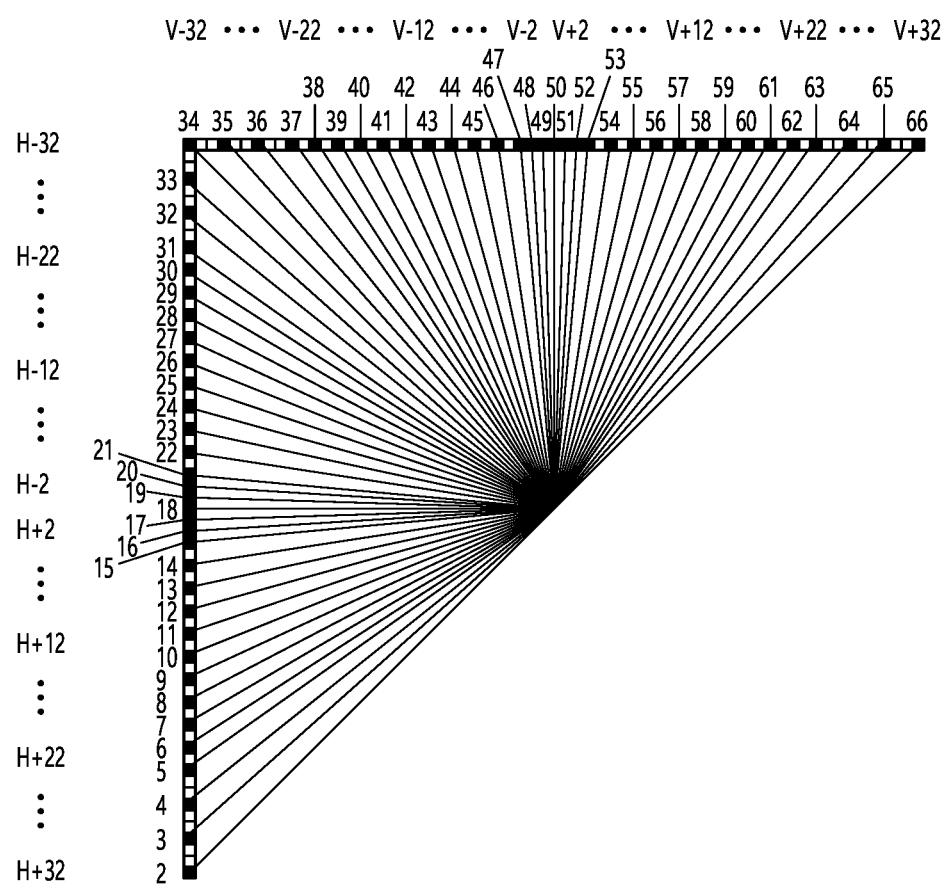
FIG. 6 is a diagram illustrating an example of directional intra prediction modes.

FIG. 6 is a diagram illustrating an example of directional intra prediction modes.

When intra prediction is applied to the current block, the encoding apparatus and/or the decoding apparatus according to an embodiment may derive an intra prediction mode for the current block, and derive prediction samples for the current block based on the intra prediction mode. That is, the encoding apparatus and/or the decoding apparatus may derive prediction samples for the current block by enabling a directional intra prediction mode or a non-directional intra prediction mode based on neighboring reference samples of the current block.

In an example, the intra prediction modes may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. Intra prediction based on the 65 directional intra prediction modes may be applied to blocks of all sizes, and may be applied to both a luma component and a chroma component. However, this is only an example, and configurations of intra prediction modes may be different.

Alternatively, the intra prediction mode may include two non-directional intra prediction modes and 129 directional intra prediction modes. The non-directional intra prediction modes may include a planar intra prediction mode, and a DC intra prediction mode, and the directional intra prediction modes may include a No. 2 to a No. 130 intra prediction modes.

Meanwhile, the intra prediction mode may further include a cross-component linear model (CCLM) mode for the chroma sample in addition to the above-described intra prediction modes. The CCLM mode may be classified into LT_CCLM, L_CCLM, and T_CCLM depending on whether left samples are considered, top samples are considered, or both are considered to derive LM parameters, and may be applied only to a chroma component.

The intra prediction mode may be indexed, for example, as shown in Table 1 below.

TABLE 1

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_ CCLM, INTRA_L_CCLM, INTRA_T_CCLM |

Meanwhile, the intra prediction type (or additional intra prediction mode, etc.) may include at least one of the above-described LIP, PDPC, MRL, and ISP. The intra prediction type may be indicated based on intra prediction type information, and the intra prediction type information may be implemented in various forms. In one example, the intra prediction type information may include intra prediction type index information indicating one of the intra prediction types. In another example, the intra prediction type information may include at least one of reference sample line information related to whether the MRL is applied to the current block and, if applied, which reference sample line is used (e.g., intra_luma_ref_idx), ISP flag information related to whether the ISP is applied to the current block (e.g., intra_subpartitions_split_flag), flag information related to whether PDCP is applied, or flag information related to whether LIP is applied.

Referring to FIG. 6, it is possible to distinguish an intra prediction mode having a horizontal directionality from an intra prediction mode having a vertical directionality around a No. 34 intra prediction mode having a left upward diagonal prediction direction. H and V of FIG. 6 mean horizontal directionality and vertical directionality, respectively, and numerals-32 to 32 indicate displacements in $\frac{1}{32}$ units on the sample grid position. The Nos. 2 to 33 intra prediction modes have the horizontal directionality, and the Nos. 34 to 66 intra prediction modes have the vertical directionality. The No. 18 intra prediction mode and the No. 50 intra prediction mode may be a horizontal intra prediction mode and a vertical intra prediction mode, respectively; the No. 2 intra prediction mode may be called a left downward diagonal intra prediction mode; the No. 34 intra prediction mode may be called a left upward diagonal intra prediction mode; and the No. 66 intra prediction mode may be called a right upward diagonal intra prediction mode.

In general, when an image is divided into blocks, a current block to be coded and a neighboring block have similar image characteristics. Therefore, it is highly likely that the current block and the neighboring block have the same or similar intra prediction modes. Accordingly, the encoder may use the intra prediction mode of the neighboring block to encode the intra prediction mode of the current block.

More specifically, the decoding apparatus may derive a most probable mode (MPM) list based on an intra prediction mode of a neighboring block (e.g., a left neighboring block and/or a top neighboring block) of the current block and additional candidate modes, and may select one of the MPM candidates in the derived MPM list based on the received MPM index, or may select one of the remaining intra prediction modes not included in the MPM candidates based on remaining intra prediction mode information. The MPM list may be referred to as an intra prediction mode candidate list or may be represented as candModeList.

When the neighboring block is intra-coded, the encoding apparatus (or encoder) may check or derive the prediction mode of the neighboring block. For example, the prediction mode of the current block may be determined based on the prediction mode of the left neighboring block and the prediction mode of the top neighboring block, and in this case, the prediction mode of the corresponding neighboring block may be determined as Most Probable Modes (MPM). Determining the MPM may be expressed as a list up of the MPM (most probable modes) candidates (or MPM list).

In an embodiment, when intra prediction is performed on the current block, prediction on a luma component block (luma block) of the current block and prediction on a chroma component block (chroma block) are performed, and in this case, the intra prediction mode for the chroma component (chroma block) may be set separately from the intra prediction mode for the luma component (luma block).

For example, an intra prediction mode for a chroma component may be indicated based on intra chroma prediction mode information, and the intra chroma prediction mode information may be signaled in the form of an intra_chroma_pred_mode syntax element. In an example, the intra chroma prediction mode information may indicate one of a planar mode, a DC mode, a vertical mode, a horizontal mode, a derived mode (DM), and CCLM (Cross-Component Linear Model) modes. In this connection, the planar mode may be No. 0 intra prediction mode; the DC mode may be No. 1 intra prediction mode; the vertical mode may be No. 26 intra prediction mode; and the horizontal mode may be No. 10 intra prediction mode. The DM may also be called a direct mode. The CCLM can be called an LM.

Figure 7:
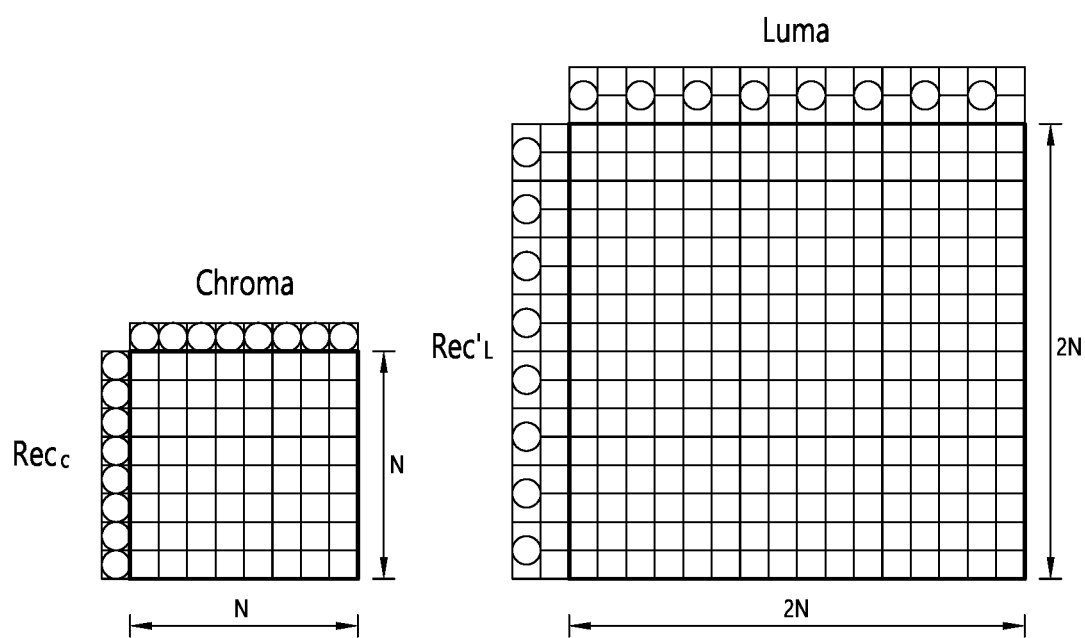
FIG. 7 is a diagram for illustrating CCLM-based intra prediction according to an embodiment.

FIG. 7 is a diagram for illustrating CCLM-based intra prediction according to an embodiment.

In an embodiment, the CCLM mode may be applied to the current chroma block. The CCLM mode may represent, as an intra prediction mode using a correlation between a luma block and a chroma block corresponding to the luma block, a mode in which a linear model may be derived based on neighboring samples of the luma block and neighboring samples of the chroma block, and prediction samples of the chroma block are derived based on the linear model and the reconstructed samples of the luma block. More specifically, when the CCLM mode is applied to the current chroma block, parameters for the linear model may be derived based on neighboring samples used for intra prediction of the current chroma block and neighboring samples used for intra prediction of the current luma block. For example, the linear model may be expressed based on Equation 1 below.

$$pred_C(i,j) = \alpha \cdot rec_L'(i,j) + \beta [ \qquad \text{[Equation 1]}$$

Here, predc(i,j) may denote a prediction sample at (i,j) coordinates of the current chroma block, and recL'(i,j) may denote a reconstructed sample at (i,j) coordinates of the current luma block. Also, the recL'(i,j) may denote a down-sampled reconstructed sample of the current luma block.

Meanwhile, the parameters α and β of the linear model may be derived based on neighboring samples used for intra prediction of the current luma block and neighboring samples used for intra prediction of the current chroma block. The parameter α and the parameter β may be derived based on Equations 2 and 3 below.

$$\alpha = \frac{N \cdot \sum(L(n) \cdot C(n)) - \sum L(n) \cdot \sum C(n)}{N \cdot \sum(L(n) \cdot L(n)) - \sum L(n) \cdot \sum L(n)} \qquad \text{[Equation 2]}$$

$$\beta = \frac{\sum C(n) - \alpha \cdot \sum L(n)}{N} \qquad \text{[Equation 3]}$$

Here, L(n) may denote top neighboring samples and/or left neighboring samples of the current luma block, and C(n) may denote top neighboring samples and/or left neighboring samples of the current chroma block. Also, the L(n) may denote down-sampled top neighboring samples and/or left neighboring samples of the current luma block. Further, N may denote a value that is twice the smaller value of width and height of the current chroma block.

In an embodiment, in order to code the chroma intra prediction mode, a total of eight intra prediction modes may be allowed for the chroma intra mode coding. The eight intra prediction modes may include five existing intra prediction modes and a cross-component linear model mode (CCLM) mode(s). Table 2 to be described later shows a mapping table for deriving an intra chroma prediction mode when the CCLM is not available, while Table 3 shows a mapping table for deriving an intra prediction mode when the CCLM is available.

TABLE 2

| | IntraPredModeY[xCh + cbWidth/2][yCb + cbHeight/2] | | | | |
|---|---|---|---|---|---|
| intra_chroma_pred_mode[xCb][yCb] | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

Table 2 shows IntraPredModeC[xCb][yCb] depending on intra_chroma_pred_mode[xCb][yCb] and IntraPredModeY[xCb+cbWidth/2][yCb+cbHeight/2] when the value of sps_cclm_enabled_flag is 0.

TABLE 3

| intra_chroma_pred_mode[xCb][yCb] | IntraPredModeY[xCb + cbWidth/2][yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

Table 3 shows IntraPredModeC[xCb][yCb] depending on intra_chroma_pred_mode[xCb][yCb] and IntraPredModeY [xCb+cbWidth/2][yCb+cbHeight/2] when the value of sps_cclm_enabled_flag is 1.

In Tables 2 and 3, sps_cclm_enabled_flag may be a flag for whether or not CCLM signaled at the SPS (Sequence Parameter Set) level is enabled; intra_chroma_pred_mode may be intra chroma prediction mode information; IntraPredModeY may be intra prediction mode information of a luma block; IntraPredModeC may be intra prediction mode information of a chroma block; xCb may be the x-coordinate of the top-left sample of the current block; yCb may be the y-coordinate of the top-left sample of the current block; cbWidth may be the width of the current block; and cbHeight may be the height of the current block.

As shown in Tables 2 and 3, the intra-chroma prediction mode may be determined based on the value of a signaled intra-chroma prediction mode (intra_chroma_pred_mode) information and the intra luma prediction mode for a luma block (e.g., when DUAL_TREE is applied) covering a center bottom right sample of the chroma block or the current block.

Hereinafter, the chroma format will be described.

In this disclosure, a specific term or sentence is used for defining a specific information or concept. For example, the chroma format index related to the chroma format sampling structure for the current block is expressed as "chroma_format_idc"; a separate color plane flag related to whether or not three color components are coded separately is expressed as "separate_colour_plane_flag"; the chroma array type is expressed as "ChromaArrayType"; if the tree type for deriving the current block is a single tree, it is expressed as "SINGLE_TREE"; if the tree type for deriving the current block is a chroma tree within a dual tree, it is expressed as "DUAL_TREE_CHROMA"; the CCLM flag related to whether or not the CCLM that derives the Cb component or the Cr component based on the luma component is enabled is expressed as "sps_cclm_enabled_flag"; a dual tree intra flag related to whether or not the three color components are coded separately with respect to a pre-defined region within the current block is expressed as "qtbtt_dual_tree_intra_flag"; and an ALF chroma index related to whether or not ALF is applied to at least one of the Cb component and the Cr component is expressed as "alf_chroma_idc".

However, "chroma_format_idc" may be replaced with various terms such as chroma_format_idx and ChromaFormat_idc; "separate_colour_plane_flag" may be replaced with various terms such as separate_colorplane_flag, separate_colorplane_flag; the "ChromaArrayType" may be replaced with chromaArrayType, or the like; "sps_cclm_enabled_flag" may be replaced with cclm_flag, cclm_enabled_flag, or the like; and "qtbtt_dual_tree_intra_flag" may be replaced with various terms such as dual_tree_intra_flag, dual_tree_implicit_split_flag, dual_tree_qtbtt_flag, and the like. Therefore, throughout the specification, when interpreting the specific term or sentence used to define specific information or concept in the present disclosure, an interpretation limited to that name should be refrained from, but rather it is required to interpret them while paying attention to various operations, functions, and effects according to the contents intended to be expressed by the term.

Various chroma formats, such as monochrome, 4:2:0, 4:2:2, 4:4:4, may exist in the video. In monochrome sampling, one sample array may exist, and the sample array may be a luma array. In 4:2:0 sampling, each of the two chroma arrays may have the height half that of the luma array and have the width half that of the luma array. In 4:2:2 sampling, each of the two chroma arrays may have the same height as the luma array, and have the width half that of the luma array.

In 4:4:4 sampling, the following may be applied depending on the value of separate_colour_plane_flag. If the value of separate_colour_plane_flag is 0, each of the two chroma arrays may have the same height and the same width as the luma array. ChromaArrayType may be set to be the same as chroma_format_idc. If the value of separate_colour_plane_flag is 1, the three color planes may be processed separately like monochrome sampled pictures. ChromaArrayType may be set to 0. Table 4 below shows the chroma format classification according to an embodiment.

TABLE 4

| chroma_format_idc | separate_colour_plane_flag | ChromaArrayType | Chroma format | SubWidthC | SubHeightC |
|---|---|---|---|---|---|
| 0 | 0 | 0 | Monochrome | 1 | 1 |
| 1 | 0 | 1 | 4:2:0 | 2 | 2 |
| 2 | 0 | 2 | 4:2:2 | 2 | 1 |
| 3 | 0 | 3 | 4:4:4 | 1 | 1 |
| 3 | 1 | 0 | 4:4:4 | 1 | 1 |

The following various embodiments may be provided based on the chroma format classification according to Table 4 above.

In one embodiment, a method for deriving an intra prediction mode for a chroma (block) may be provided. When the value of ChromaArrayType is not 0, the syntax element intra_chroma_pred_mode for indicating the chroma intra prediction mode may be parsed as shown in Table 5 below. When the value of ChromaArrayType is 0, the process for deriving the chroma intra prediction mode may be omitted.

TABLE 5

| | Descriptor |
|---|---|
| coding_unit( x0, y0, cbWidth, cbHeight, treeType ) { <br> ... <br> if( CuPredMode[ x0 ][ y0 ] = = MODE_INTRA ) { <br> if( sps_pcm_enabled_flag && cbWidth >= MinIpcmCbSizeY && <br> cbWidth <= MaxIpcmCbSizeY && cbHeight >= MinIpcmCbSizeY && <br> cbHeight <= MaxIpcmCbSizeY ) <br> pcm_flag[ x0 ][ y0 ] | ae(v) |
| if( pcm_flag[ x0 ][ y0 ] ) { <br> while( !byte_aligned( ) ) <br> pcm_alignment_zero_bit | f(1) |
| pcm_sample( cbWidth, cbHeight, treeType) <br> } else { <br> if( treeType = = SINGLE_TREE | | treeType = =DUAL_TREE_LUMA <br> ) { <br> if( ( y0 % CtbSizeY ) > 0 ) <br> intra_luma_ref_idx[ x0 ][ y0 ] | ae(v) |
| if (intra_luma_ref_idx[ x0 ][ y0 ] = = 0 && ( cbWidth <= MaxTbSizeY <br> | | cbHeight <= MaxTbSizeY ) && ( cbWidth * cbHeight > <br> MinTbSizeY * MinTbSizeY )) <br> intra_subpartitions_mode_flag[ x0 ][ y0 ] | ae(v) |
| if( intra_subpartitions_mode_flag[ x0 ][ y0 ] = = 1 && cbWidth <= <br> MaxTbSizeY && cbHeight <= MaxTbSizeY ) <br> intra_subpartitions_split_flag[ x0 ][ y0 ] | ae(v) |
| if( intra_luma_ref_idx[ x0 ][ y0 ] = = 0 && <br> inta_subpartitions_mode_flag[ x0 ][ y0 ] = = 0 ) <br> intra_luma_mpm_flag[ x0 ][ y0 ] | ae(v) |
| if( intra_luma_mpm_flag[ x0 ][ y0 ] ) <br> intra_luma_mpm_idx [ x0 ][ y0 ] | ae(v) |
| else <br> intra_luma_mpm_remainder[ x0 ][ y0 ] | ae(v) |
| } <br> if( ChromaArrayType != 0 ) { <br> if( treeType = = SINGLE_TREE | | treeType = = <br> DUAL_TREE_CHROMA ) <br> intra_chroma_pred_mode[ x0 ][ y0 ] | ae(v) |
| } <br> } <br> ... <br> } <br> ... <br> } | |

In Table 5, intra_chroma_pred_mode[x0][y0] may denote an intra prediction mode for chroma samples. x0 and y0 denote the positions (x0, y0) of the top-left luma sample of the (current) coding block for the top-left luma sample of the picture.

As disclosed in Table 5, when ChromaArrayType !=0, it may be checked whether or not if(treeType== SINGLE_TREE II treeType==DUAL_TREE_CHROMA) is satisfied in order to derive the intra_chroma_pred_mode[x0][y0]. That is, based on the determination that the value of ChromaArrayType is not 0, it is possible to determine whether the tree type for deriving the current block is a chroma tree within a single tree or a dual tree, and depending on this determination, whether to derive the intra_chroma_pred_mode[x0][y0] may be selected.

In an embodiment, a PCM sample derivation method for chroma (block) may be provided. When the value of ChromaArrayType is not 0, the syntax element pcm_sample_chroma for indicating the coded chroma sample value may be parsed as disclosed in Table 6 below.

TABLE 6

| | Descriptor |
|---|---|
| pcm_sample( cbWidth, cbHeight, treeType ) { <br> if( treeType = = SINGLE_TREE | | treeType = = DUAL_TREE_LUMA <br> ) { <br> for( i = 0; i < cbWidth * cbHeight; i++ ) <br> pcm_sample_luma[ i ] | u(v) |
| } <br> if (ChromaArrayType !=0 ) { <br> if( treeType = = SINGLE_TREE | | treeType = = <br> DUAL_TREE_CHROMA) { <br> for( i = 0; i < <br> 2 * ( ( cbWidth * cbHeigt ) / ( SubWidthC * SubHeightC ) ); i++ <br> ) <br> pcm_sample_chroma[ i ] | u(v) |
| } <br> } <br> } | |

In Table 6, pcm_sample_chroma[i] may denote a coded chroma sample value in a raster scan order within a coding unit. Values of the first half may be the coded Cb samples, and values of the remaining half may be the coded Cr samples. The number of bits used to represent each of these samples is $PcmBitDepth_C$.

In an embodiment, a method of parsing a Coded Block Flag (CBF) for a chroma (block) may be provided. When the value of chromaArrayType is not 0, tu_cbf_cb and tu_cbf_cr for indicating the chroma intra prediction mode may be parsed as disclosed in Table 7 below. When the value of chromaArrayType is 0, tu_cbf_cb and tu_cbf_cr may be estimated to be 0, and thus a process of deriving a transform coefficient for chroma may be omitted.

TABLE 7

| | Descriptor |
|---|---|
| transform_unit( x0, y0, tbWidth, tbHeight, treeType, subTuIndex ) { | |
| ... | |
| if(chromaArrayType !=0) { | |
| if( ( treeType = = SINGLE_TREE | | treeType = = DUAL_TREE_CHROMA ) { | |
| if( ( IntraSubPartitionsSplitType = = ISP_NO_SPLIT && !( cu_sbt_flag && ( ( subTuIndex = = 0 && cu_sbt_pos_flag ) | | ( subTuIndex = = 1 && !cu_sbt_pos_flag ) ) ) ) | | ( IntraSubPartitionsSplitType != ISP_NO_SPLIT && ( subTuIndex = = NumIntraSubPartitions - 1 ) ) ) { | |
| tu_cbf_cb[ x0 ][ y0 ] | ae(v) |
| tu_cbf_cr[ x0 ][ y0 ] | ae(v) |
| } | |
| } | |
| } | |
| ... | |
| } | |

If the value of tu_cbf_cb[x0][y0] is 1, the Cb transform block may include one or more non-zero transform coefficient levels. The array indices x0 and y0 indicate the top-left position (x0, y0) of the transform block. If tu_cbf_cb[x0][y0] does not exist in the current CU, its value may be estimated as 0.

If the value of tu_cbf_cr[x0][y0] is 1, the Cr transform block may include one or more non-zero transform coefficient levels. The array indices x0 and y0 indicate the top-left position (x0, y0) of the transform block. If tu_cbf_cr[x0][y0] does not exist in the current CU, its value may be estimated as 0.

In an embodiment, a coding method for an implicit quadtree split within a dual tree of an I tile group may be provided in relation to a chroma format. The I tile group may have two types of treeType. One is a single tree and the other is a dual tree. When the I tile group dual tree is applied, the luma and chroma components may have their own block structures. In other words, the chroma component may have the same block structure as the luma component, or may have a different block structure.

When the value of chromaArrayType is not 0, luma and chroma may have dependency such as chroma intra prediction mode derivation from luma, CCLM for chroma intra blocks or the like. When taking hardware implementation complexity into consideration, it may be necessary to limit the dependency between the luma and chroma to a certain extent (e.g., may be referred to as a pipelining region) to enable pipelining. The pipelining area may be set to 64×64, or may be set to 32×32 in consideration of some limited hardware resources.

When the value of qtbtt_dual_tree_intra_flag is 1, for an I tile group, each coding tree unit (CTU) may be divided into coding units which use implicit quadtree division in a predefined luma sample region. The coding units may be the root of two separate coding_tree syntax structures for luma and chroma. When the value of qtbtt_dual_tree_intra_flag is 0, the implicit quadtree division may be omitted. Table 8 below shows an example in which qtbtt_dual_tree_intra_flag is parsed at the sequence parameter set (SPS) level when the value of ChromaArrayType is not 0.

TABLE 8

| | Descriptor |
|---|---|
| seq_parameter_set_rbsp( ) { | |
| ... | |
| if( ChromaArrayType != 0 ) | |
| qtbtt_dual_tree_intra_flag | u(1) |
| ... | |
| } | |

Referring to Table 8, qtbtt_dual_tree_intra_flag may be parsed when the value of chromaArrayType is not 0. When the value of chromaArrayType is 0, qtbtt_dual_tree_intra_flag does not appear and may be estimated to be 0. When chroma format 4:4:4 is employed in monochrome or a separate color plane, the value of chromaArrayType may be 0. In the case where the chroma format 4:4:4 is employed in the monochrome or separate color plane, nested division may not be required since there is no luma and chroma dependency.

In an embodiment, a CCLM intra prediction method may be provided with regard to a chroma format. When the value of chromaArrayType is not 0, luma and chroma may have the same dependency as CCLM prediction for chroma intra blocks. For chroma sample intra prediction, a CCLM parameter may be applied to reconstructed luma samples. Table 9 below shows an example in which sps_cclm_enabled_flag is parsed when the value of ChromaArrayType is not 0.

TABLE 9

| | Descriptor |
|---|---|
| seq_parameter_set_rbsp( ) { | |
| ... | |
| if( ChromaArrayType != 0 ) | |
| sps_cclm_enabled_flag | u(1) |
| if( sps_cclm_enabled_flag && chroma_format_idc = = 1 ) | |
| sps_cclm_colocated_chroma_flag | u(1) |
| ... | |
| } | |

In Table 9, when the value of sps_cclm_enabled_flag is 0, CCLM from the luma component to the chroma component may not be enabled. When the value of sps_cclm_enabled_flag is 1, CCLM from the luma component to the chroma component may be enabled. When sps_cclm_enabled_flag does not exist, the value of sps_cclm_enabled_flag may be estimated to be 0.

In an embodiment, information on the color plane may be signaled with regard to the chroma format. Tables 10 and 11 below disclose separate_colour_plane_flag and colour_plane_id, which are information on the color plane, and chroma_format_idc, which is information on the chroma format, as follows.

TABLE 10

| | Descriptor |
|---|---|
| seq_parameter_set_rbsp( ) { | |
| ... | |
| if( chroma_format_idc = = 3 ) | |
| separate_colour_plane_flag | u(1) |
| ... | |
| } | |

TABLE 11

| | Descriptor |
|---|---|
| tile_group_header( ) { | |
| ... | |
| if( separate_colour_plane_flag = = 1 ) | |
| colour_plane_id | u(2) |
| ... | |
| } | |

In Tables 10 and 11, when the value of separate_colour_plane_flag is 1, the three color components of the 4:4:4 chroma format may be coded separately. If the value of separate_colour_plane_flag is 1, colour_plane_id may be parsed to specify different color components. colour_plane_id may indicate a color plane associated with the current tile RBSP when the value of separate_colour_plane_flag is 1. The value of colour_plane_id may be included in the range of 0 to 2. The colour_plane_id values 0, 1, and 2 may correspond to luma (Y), chroma Cb, and chroma Cr, respectively. The dependency may not exist in the decoding process between pictures having different colour_plane_id values.

In an embodiment, a method in which an Adaptive Loop Filter (ALF) chroma index is signaled with regard to a chroma format may be provided. When a Network Associated Layer (NAL) unit of APS_NUT (Apapatation Parameter Set) is signaled, ALF data may be included. The ALF data may include alf_chroma_idc related to whether or not ALF should be applied to the chroma component. As described in Table 12 below, alf_chroma_idc may be parsed when the value of ChromaArrayType is not 0.

TABLE 12

| | Descriptor |
|---|---|
| alf_data( ) { | |
| ... | |
| if( ChromaArrayType != 0 ) | |
| alf_chroma_idc | tu(v) |
| ... | |
| } | |

If the value of alf_chroma_idc is 0, ALF may not be applied to Cb and Cr color components. When the value of alf_chroma_idc is 1, ALF may be applied to the Cb color component. When the value of alf_chroma_idc is 2, ALF may be applied to the Cr color component. When the value of alf_chroma_idc is 3, ALF may be applied to the Cb and Cr color components. If alf_chroma_idc does not exist, the value of alf_chroma_idc may be estimated to be 0.

Figure 8:
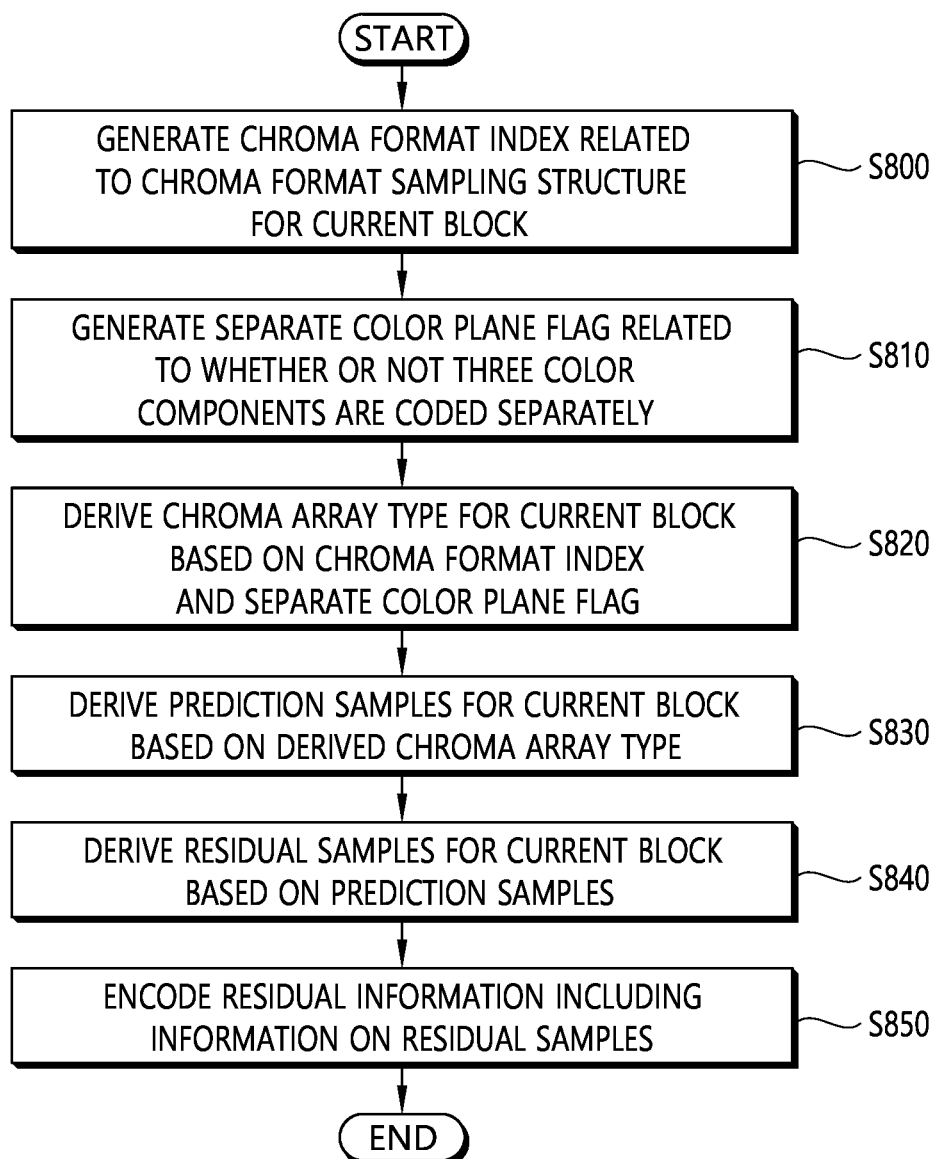
FIG. 8 is a flowchart illustrating operation of an encoding apparatus according to an embodiment.
Figure 9:
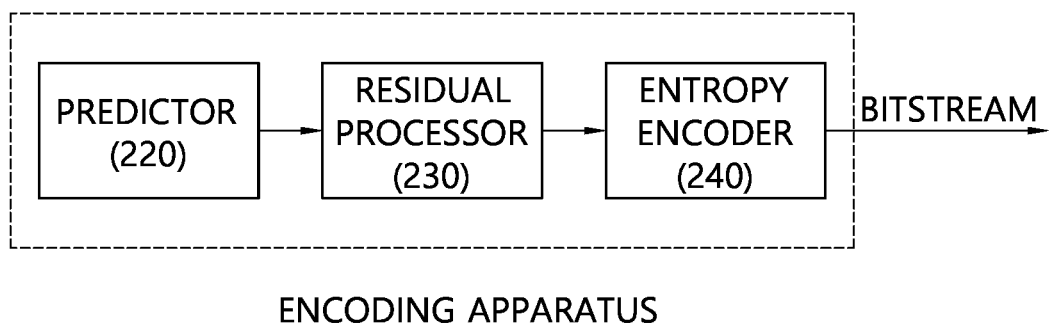
FIG. 9 is a block diagram illustrating a configuration of an encoding apparatus according to an embodiment.

FIG. 8 is a flowchart illustrating an operation of an encoding apparatus according to an embodiment, and FIG. 9 is a block diagram illustrating a configuration of an encoding apparatus according to an embodiment.

Figure 10:
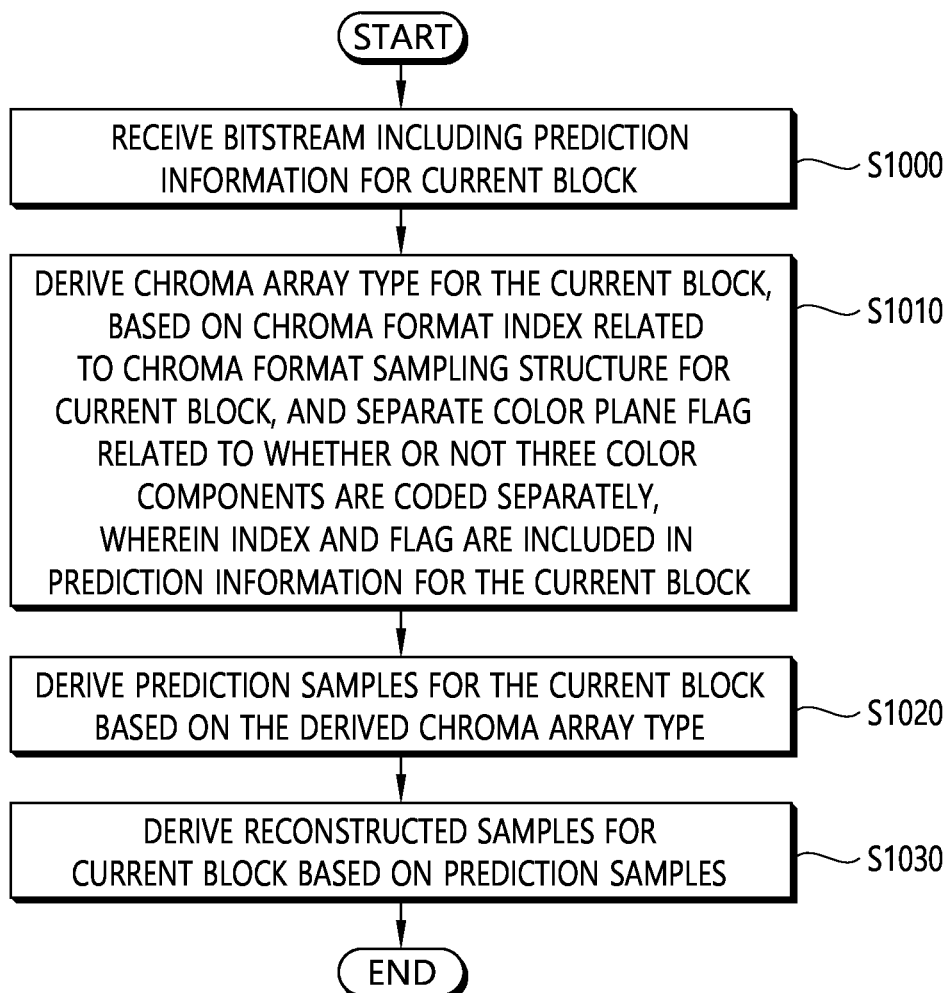
FIG. 10 is a flowchart illustrating operation of a decoding apparatus according to an embodiment.
Figure 11:
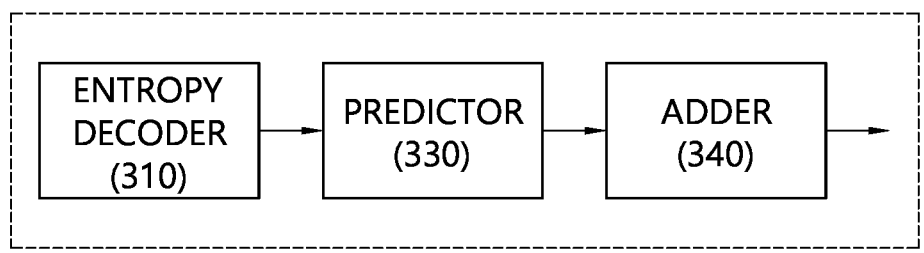
FIG. 11 is a block diagram illustrating a configuration of a decoding apparatus according to an embodiment.

The encoding apparatus according to FIGS. 8 and 9 may perform operations corresponding to those of a decoding apparatus according to FIGS. 10 and 11. Therefore, operations of the decoding apparatus to be described later in FIGS. 10 and 11 may be similarly applied to the encoding apparatus according to FIGS. 8 and 9.

Each step disclosed in FIG. 8 may be performed by the encoding apparatus 200 disclosed in FIG. 2. More specifically, steps S800 to S830 may be performed by the predictor 220 disclosed in FIG. 2, step S840 may be performed by the residual processor 230 disclosed in FIG. 2, and step S850 may be performed by the entropy encoder 240 disclosed in FIG. 2. Further, operations according to S800 to S850 are based on some of contents described above in FIGS. 4 to 7. Therefore, an explanation for the specific contents redundant with those described above in FIGS. 2, and 4A to 7 will be omitted or made briefly.

As shown in FIG. 11, the encoding apparatus according to an embodiment may include the predictor 220 and the entropy encoder 240. However, in some cases, all of the components shown in FIG. 11 may not be essential components of the encoding apparatus, and the encoding apparatus may be implemented by more or less components than those shown in FIG. 11.

In the encoding apparatus according to an embodiment, the predictor 220 and the entropy encoder 240 may be implemented by separate chips, or at least two or more components may be implemented by a single chip.

The encoding apparatus according to an embodiment may generate a chroma format index related to a chroma format sampling structure for a current block (S800). More specifically, the predictor 220 of the encoding apparatus may generate a chroma format index related to a chroma format sampling structure for the current block.

The encoding apparatus according to an embodiment may generate a separate color plane flag related to whether or not three color components are coded separately (S810). More specifically, the predictor 220 of the encoding apparatus may generate a separate color plane flag related to whether or not three color components are coded separately.

The encoding apparatus according to an embodiment may derive the chroma array type for the current block based on the chroma format index and the separate color plane flag (S820). More specifically, the predictor 220 of the encoding apparatus may derive the chroma array type for the current block based on the chroma format index and the separate color plane flag.

The encoding apparatus according to an embodiment may derive prediction samples for the current block based on the derived chroma array type (S830). More specifically, the predictor 220 of the encoding apparatus may derive prediction samples for the current block based on the derived chroma array type.

The encoding apparatus according to an embodiment may derive the residual samples for the current block based on the prediction samples (S840). More specifically, the residual processor 230 of the encoding apparatus may derive residual samples for the current block based on the prediction samples.

The encoding apparatus according to an embodiment may encode residual information including information on residual samples (S850). More specifically, the entropy encoder 240 of the encoding apparatus may encode residual information including information on the residual samples.

In an embodiment, the three color components may include a luma component and chroma components, and the chroma components may include a Cb component and a Cr component.

In one embodiment, the deriving the prediction samples for the current block may include checking that the value of the chroma array type is not 0, and whether or not a tree type for deriving the current block is a chroma tree within a single tree or dual tree.

In an embodiment, the value of the chroma array type may be determined to be 0 based on determination that the value of the chroma format index is 0 or the value of the separate color plane flag is 1. It may be determined that the value of the chroma array type is not 0 based on determination that the value of the chroma format index is not 0 and the value of the separate color plane flag is 0.

The encoding apparatus according to an embodiment, when deriving the prediction samples for the current block, may derive the intra chroma prediction mode for the current block based on determination that the tree type for deriving the current block is the chroma tree within the single tree or the dual tree, and derive the prediction samples for the current block based on the intra chroma prediction mode.

The encoding apparatus according to an embodiment may derive a dual tree intra flag related to whether or not the three color components are coded separately with respect to a predefined region within the current block, based on determination that the value of the chroma array type is not 0.

The encoding apparatus according to an embodiment may create a CCLM flag related to whether or not a Cross-Component Linear Model (CLLM) for deriving the Cb component or the Cr component based on the luma component is applied, based on determination that the value of the chroma array type is not 0.

The encoding apparatus according to an embodiment may generate an ALF chroma index related to whether or not an adaptive loop filter (ALF) is applied to at least one of the Cb component and the Cr component, based on determination that the value of the chroma array type is not 0.

In an embodiment, the ALF may not be applied to the Cb component and the Cr component based on determination that the value of the ALF chroma index is 0; the ALF may be applied to the Cb component based on determination that the value of the ALF chroma index is 1; the ALF may be applied to the Cr component based on determination that the value of the ALF chroma index is 2; and the ALF may be applied to the Cb component and the Cr component based on determination that the value of the ALF chroma index is 3.

According to the encoding apparatus of FIGS. 8 and 9 and the operation method of the encoding apparatus, the encoding apparatus may generate the chroma format index related to the chroma format sampling structure for the current block (S800), generate the separate color plane flag related to whether or not the three color components are coded separately (S810), derive a chroma array type for the current block based on the chroma format index and the separate color plane flag (S820), derive prediction samples for the current block based on the derived chroma array type (S830), derive residual samples for the current block based on the prediction samples (S840), and encode residual information including information on the residual samples (S850), wherein in this case, the three color components include a luma component and chroma components, and the chroma components include a Cb component and a Cr component, and wherein the deriving the prediction samples for the current block may include checking that the value of the chroma array type is not 0 and whether or not the tree type for deriving the current block is a chroma tree within a single tree or a dual tree.

That is, according to this disclosure, the efficiency of intra prediction can be increased by efficiently signaling information on the chroma format. Alternatively, according to this disclosure, the current block may be efficiently predicted based on the chroma array type for the current block. Alternatively, according to the this disclosure, by determining whether or not the tree type for deriving the current block is a chroma tree within a single tree or a dual tree, based on determination that the value of the chroma array type for the current block is not 0, and by selecting whether or not to derive intra_chroma_pred_mode according to the determination about the chroma tree type, the current block can be efficiently predicted.

FIG. 10 is a flowchart illustrating operation of a decoding apparatus according to an embodiment, and FIG. 11 is a block diagram illustrating configuration of a decoding apparatus according to an embodiment.

Each of steps disclosed in FIG. 10 may be performed by the decoding apparatus 300 disclosed in FIG. 3. More specifically, S1000 may be performed by the entropy decoder 310 disclosed in FIGS. 3, S1010 and S1020 may be performed by the predictor 330 disclosed in FIG. 3, and S1030 may be performed by the adder 340 disclosed in FIG. 3. In addition, operations according to S1000 to S1030 are based on some of contents described above with reference to FIGS. 4 to 7. Therefore, an explanation for the specific contents redundant with those described above in FIGS. 3 to 7 will be omitted or made briefly.

As shown in FIG. 11, the decoding apparatus according to an embodiment may include the entropy decoder 310, the predictor 330, and the adder 340. However, in some cases, all of the components shown in FIG. 11 may not be necessarily essential to the decoding apparatus, and the decoding apparatus may be implemented by more or less components than those shown in FIG. 11.

In the decoding apparatus according to an embodiment, the entropy decoder 310, the predictor 330, and the adder 340 may be implemented by separate chips, or at least two or more components may be implemented by a single chip.

The decoding apparatus according to an embodiment may receive a bitstream including prediction information for a current block (S1000). More specifically, the entropy decoder 310 of the decoding apparatus may receive a bitstream including prediction information for a current block.

The decoding apparatus according to an embodiment may derive a chroma array type for the current block based on a chroma format index related to a chroma format sampling structure for the current block, and a separate color plane flag related to whether or not three color components are coded separately, wherein the chroma format index and the separate color plane flag are included in the prediction information for the current block (S1010). More specifically, the predictor 330 of the decoding apparatus may derive a chroma array type for the current block based on a chroma format index related to a chroma format sampling structure for the current block, and a separate color plane flag related to whether or not three color components are coded separately, wherein the chroma format index and the separate color plane flag are included in the prediction information for the current block.

In one example, the chroma format index may be expressed as chroma_format_idc; the separate color plane flag may be expressed as separate_colour_plane_flag; and the chroma array type may be expressed as ChromaArrayType.

The decoding apparatus according to an embodiment may derive prediction samples for the current block based on the derived chroma array type (S1020). More specifically, the predictor 330 of the decoding apparatus may derive prediction samples for the current block based on the derived chroma array type.

The decoding apparatus according to an embodiment may derive reconstructed samples for the current block based on the prediction samples (S1030). More specifically, the adder 340 of the decoding apparatus may derive reconstructed samples for the current block based on the prediction samples.

In an embodiment, the three color components may include a luma component and chroma components, and the chroma components may include a Cb component and a Cr component. In one example, the luma component may be expressed as a luma color component; the chroma components may be expressed as chroma color components; the Cb component may be expressed as a Cb color component; and the Cr component may be expressed as a Cr color component.

The decoding apparatus according to an embodiment, when deriving the prediction samples for the current block, may check that the value of the chroma array type is not 0, and whether or not a tree type for deriving the current block is a chroma tree within a single tree or dual tree. In one example, the single tree may be expressed as SINGLE_TREE, and the chroma tree within the dual tree may be expressed as DUAL_TREE_CHROMA.

In an embodiment, the value of the chroma array type may be determined to be 0 based on determination that the value of the chroma format index is 0 or the value of the separate color plane flag is 1. It may be determined that the value of the chroma array type is not 0 based on determination that the value of the chroma format index is not 0 and the value of the separate color plane flag is 0. This can be confirmed by referring to Table 4 above.

The decoding apparatus according to an embodiment, when deriving the prediction samples for the current block, may derive the intra chroma prediction mode for the current block based on determination that the value of the chroma array type is not 0, and the tree type for deriving the current block is the chroma tree within the single tree or the dual tree, and derive the prediction samples for the current block based on the intra chroma prediction mode.

The decoding apparatus according to an embodiment may decode a dual tree intra flag included in the prediction information for the current block, and related to whether or not the three color components are coded separately with respect to a predefined region within the current block, based on determination that the value of the chroma array type is not 0. In an example, the dual tree intra flag may be expressed as qtbtt_dual_tree_intra_flag.

The decoding apparatus according to an embodiment may decode a CCLM flag included in the prediction information for the current block, and related to whether or not a Cross-Component Linear Model (CLLM) deriving the Cb component or the Cr component based on the luma component is enabled, based on determination that the value of the chroma array type is not 0. In an example, the CCLM flag may be denoted as sps_cclm_enabled_flag.

In an embodiment, the bitstream may further include adaptive loop filter (ALF) information, and the decoding apparatus may decode an ALF chroma index included in the ALF information, and related to whether ALF is applied to at least one of the Cb component or the Cr component, based on determination that the value of the chroma array type is not 0. In an example, the ALF chroma index may be expressed as alf_chroma_idc.

In an embodiment, the ALF may not be applied to the Cb component and the Cr component based on determination that the value of the ALF chroma index is 0; the ALF may be applied to the Cb component based on determination that the value of the ALF chroma index is 1; the ALF may be applied to the Cr component based on determination that the value of the ALF chroma index is 2; and the ALF may be applied to the Cb component and the Cr component based on determination that the value of the ALF chroma index is 3.

According to the decoding apparatus and the operation method of the decoding apparatus disclosed in FIGS. 10 and 11, the decoding apparatus may receive a bitstream including prediction information for a current block (S1000), derives a chroma array type for the current block based on a chroma format index related to a chroma format sampling structure for the current block, and on a separate color plane flag related to whether or not three color components are coded separately, wherein the chroma format index and the separate color plane flag are included in the prediction information for the current block (S1010), deriving prediction samples for the current block based on the derived chroma array type (S1020), and derive reconstructed samples for the current block based on the prediction samples (S1030), wherein the three color components include a luma component and chroma components, and the chroma components include a Cb component and a Cr component, and wherein the deriving the prediction samples for the current block includes checking that the value of the chroma array type is not 0, and whether or not a tree type for deriving the current block is a chroma tree within a single tree or dual tree.

That is, according to this disclosure, the efficiency of intra prediction can be increased by efficiently signaling information on the chroma format. Alternatively, according to this disclosure, the current block may be efficiently predicted based on the chroma array type for the current block. Alternatively, according to the this disclosure, by determining whether or not the tree type for deriving the current block is a chroma tree within a single tree or a dual tree, based on determination that the value of the chroma array type for the current block is not 0, and by selecting whether or not to derive intra_chroma_pred_mode according to the determination about the chroma tree type, the current block can be efficiently predicted.

Although methods have been described on the basis of a flowchart in which steps or blocks are listed in sequence in the above-described embodiments, the steps of the present disclosure are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the present disclosure is applied may be produced in the form of a program being executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiments of the present disclosure may be embodied as a computer program product based on a program code, and the program code may be executed on a computer by the embodiments of the present disclosure. The program code may be stored on a computer-readable carrier.

Figure 12:
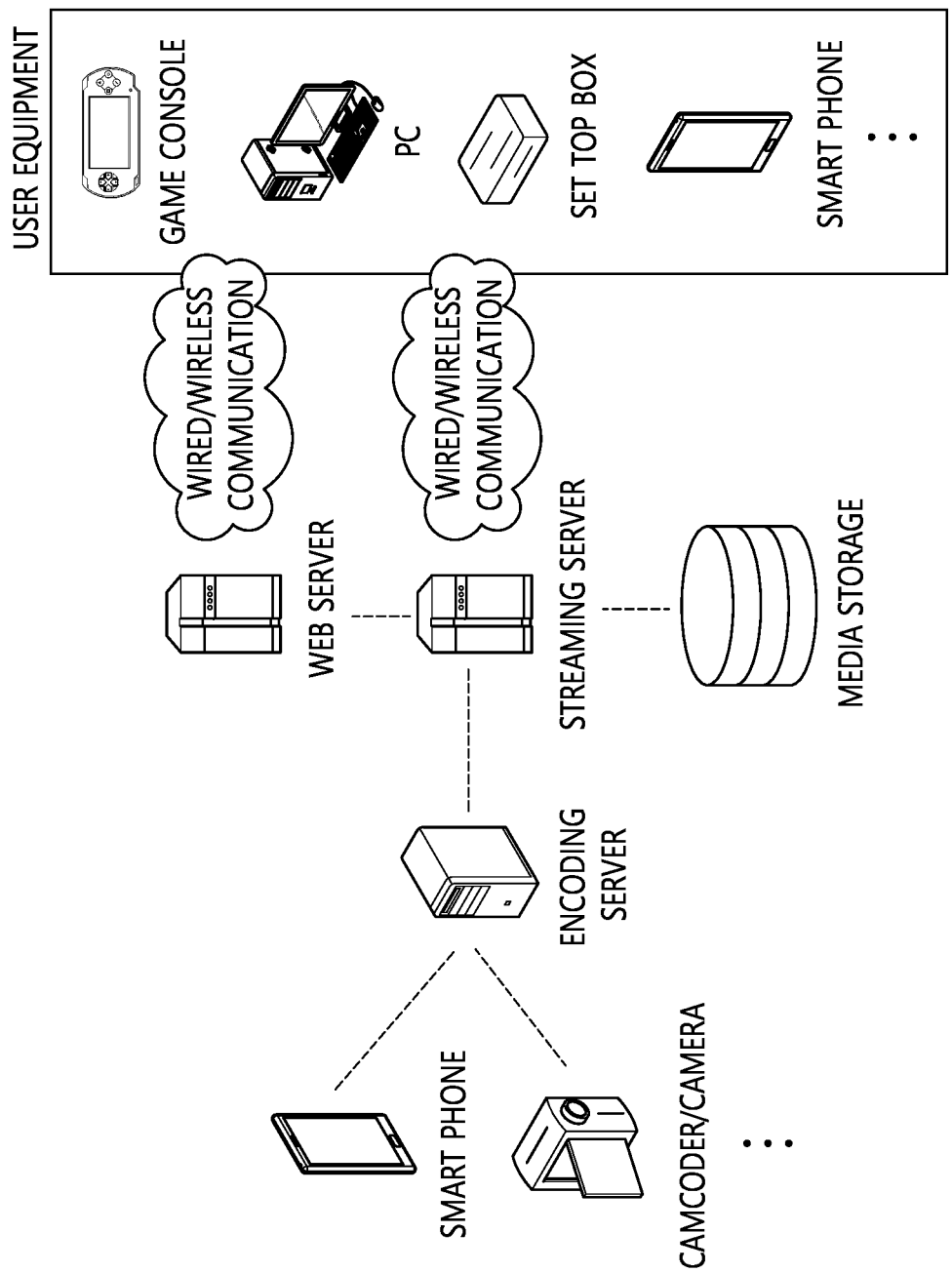
FIG. 12 illustrates an example of a content streaming system to which the disclosure of this document may be applied.

FIG. 12 represents an example of a content streaming system to which the disclosure of the present document may be applied.

Referring to FIG. 12, the content streaming system to which the embodiments of the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner.

What is claimed is:

1. An image decoding method performed by a decoding apparatus, the method comprising:
   obtaining image information including residual information and information related to a chroma format from a bitstream;
   deriving a chroma array type based on chroma format indicator information representing the chroma format, the chroma format indicator information being included in the information related to the chroma format;
   deriving prediction samples for a current block based on the derived chroma array type;
   deriving residual samples for the current block based on the residual information; and
   generating reconstructed samples for the current block based on the prediction samples and the residual samples,
   wherein the image information includes a sequence parameter set (SPS),
   wherein a value of the chroma array type is equal to a value of the chroma format indicator information,
   wherein based on the value of the chroma array type being not equal to 0 and a tree type for the current block being a single tree or a dual tree chroma, intra chroma prediction mode information for the current block is obtained from the bitstream,
   wherein an intra chroma prediction mode of the current block is derived based on the intra chroma prediction mode information,
   wherein the prediction samples for the current block are derived based on the intra chroma prediction mode,
   wherein whether a dual tree intra flag is included in the SPS is determined based on the value of the chroma array type, wherein the dual tree intra flag is related to whether each coding tree unit (CTU) is split into coding units (CUs) of a predefined area using implicit quadtree split, and
   wherein based on the value of the chroma array type being not equal to 0, the dual tree intra flag is included in the SPS.

2. The image decoding method of claim 1, wherein the information related to the chroma format further includes a separate color plane flag, and
   wherein based on a value of the separate color plane flag being equal to 0, the value of the chroma array type is equal to the value of the chroma format indicator information.

3. An image encoding method performed by an encoding apparatus, the method comprising:
   generating chroma format indicator information representing a chroma format;
   deriving a chroma array type based on the chroma format indicator information;
   deriving prediction samples for a current block based on the derived chroma array type;
   deriving residual samples for the current block based on the prediction samples;
   generating residual information based on the residual samples; and
   encoding image information including the residual information,
   wherein the image information includes a sequence parameter set (SPS),
   wherein a value of the chroma array type is equal to a value of the chroma format indicator information,
   wherein based on the value of the chroma array type being not equal to 0 and a tree type for the current block being a single tree or a dual tree chroma, intra chroma prediction mode information for the current block is further encoded,
   wherein the intra chroma prediction mode information represents an intra chroma prediction mode used for deriving the prediction samples for the current block,
   wherein whether a dual tree intra flag is included in the SPS is determined based on the value of the chroma array type, wherein the dual tree intra flag is related to whether each coding tree unit (CTU) is split into coding units (CUs) of a predefined area using implicit quadtree split, and
   wherein based on the value of the chroma array type being not equal to 0, the dual tree intra flag is included in the SPS.

4. The image encoding method of claim 3, further comprising:
   generating a separate color plane flag,
   wherein based on a value of the separate color plane flag being equal to 0, the value of the chroma array type is equal to the value of the chroma format indicator information.

5. A transmission method of data for an image, the method comprising:
   obtaining a bitstream for the image, wherein the bitstream is generated based on generating chroma format indicator information representing a chroma format, deriving a chroma array type based on the chroma format indicator information, deriving prediction samples for a current block based on the derived chroma array type, deriving residual samples for the current block based on the prediction samples, generating residual information based on the residual samples, and encoding image information including the residual information; and
   transmitting the data comprising the bitstream,
   wherein the image information includes a sequence parameter set (SPS),
   wherein a value of the chroma array type is equal to a value of the chroma format indicator information,
   wherein based on the value of the chroma array type being not equal to 0 and a tree type for the current block being a single tree or a dual tree chroma, intra chroma prediction mode information for the current block is further encoded,
   wherein the intra chroma prediction mode information represents an intra chroma prediction mode used for deriving the prediction samples for the current block,
   wherein whether a dual tree intra flag is included in the SPS is determined based on the value of the chroma array type, wherein the dual tree intra flag is related to whether each coding tree unit (CTU) is split into coding units (CUs) of a predefined area using implicit quadtree split, and
   wherein based on the value of the chroma array type being not equal to 0, the dual tree intra flag is included in the SPS.

* * * * *